United States Patent [19]
Preston et al.

[11] Patent Number: 5,653,554
[45] Date of Patent: Aug. 5, 1997

[54] APPARATUS FOR REMOVING PIPING FROM THE GROUND

[75] Inventors: Nicholas Jason John Preston, Warrington; Graham Arthur Austin, Burnley, both of United Kingdom

[73] Assignee: North West Water Group PLC, United Kingdom

[21] Appl. No.: 337,068

[22] Filed: Nov. 10, 1994

[30] Foreign Application Priority Data

Nov. 13, 1993 [GB] United Kingdom .................. 9323470

[51] Int. Cl.⁶ ........................................... F16L 1/028
[52] U.S. Cl. ............................... 405/154; 294/86.25
[58] Field of Search ............................ 405/154, 184; 166/301, 98; 294/86.25, 86.24, 86.1, 93, 94

[56] References Cited

U.S. PATENT DOCUMENTS

| | | | |
|---|---|---|---|
| 1,508,417 | 9/1924 | Spitler | 294/86.25 |
| 1,572,983 | 2/1926 | Barrier | 294/86.24 |
| 1,694,953 | 12/1928 | Smoot | 294/86.25 |
| 1,775,291 | 9/1930 | Niles | 294/86.24 |
| 1,805,280 | 5/1931 | Gill | 294/86.24 |
| 2,650,129 | 8/1953 | Axelsen | 294/86.1 |
| 4,006,521 | 2/1977 | Pedone | 405/184 X |
| 4,287,953 | 9/1981 | Mazza | 166/301 |
| 4,637,756 | 1/1987 | Boles | 405/154 |
| 5,029,924 | 7/1991 | Stuckey | 294/86.12 |

FOREIGN PATENT DOCUMENTS

| | | | |
|---|---|---|---|
| 4-5395 | 1/1992 | Japan | 405/154 |
| 1583586 | 8/1990 | U.S.S.R. | 294/86.25 |
| 1 238 578 | 7/1971 | United Kingdom . | |
| 1 458 592 | 12/1976 | United Kingdom . | |
| 2103753 | of 1983 | United Kingdom . | |
| 92/10701 | 6/1992 | WIPO . | |

*Primary Examiner*—Hoang C. Dang
*Attorney, Agent, or Firm*—Michael, Best & Friedrich

[57] ABSTRACT

Apparatus for removing piping from the ground comprises a cable (1) which has pipe engaging means (2) disposed along its length. The pipe engaging means (2) are arranged such that the cable (1) is insertable into a pipe (3) in one direction but that attempted withdrawal of the cable (1) in the opposite direction relative to the pipe (3) causes the pipe engaging means (2) to jam the cable (1) in the pipe (3). The pipe (3) can then be pulled from the ground, the pulling force being distributed along the length of the pipe (3).

6 Claims, 2 Drawing Sheets

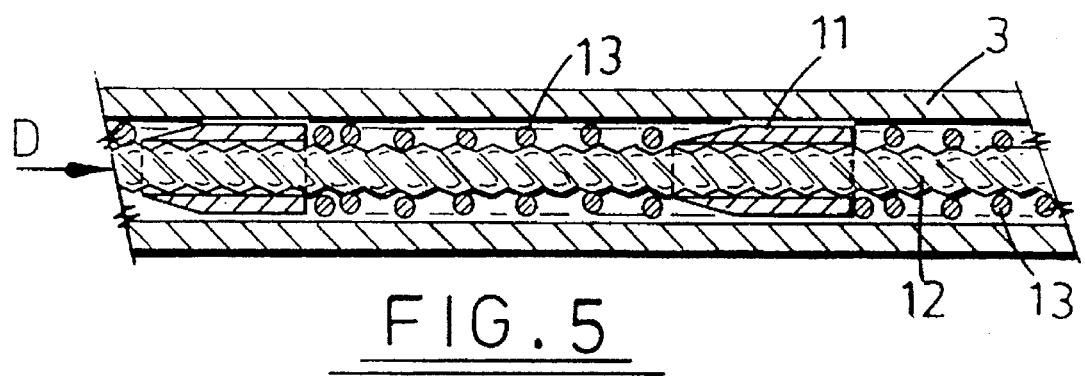
FIG. 5
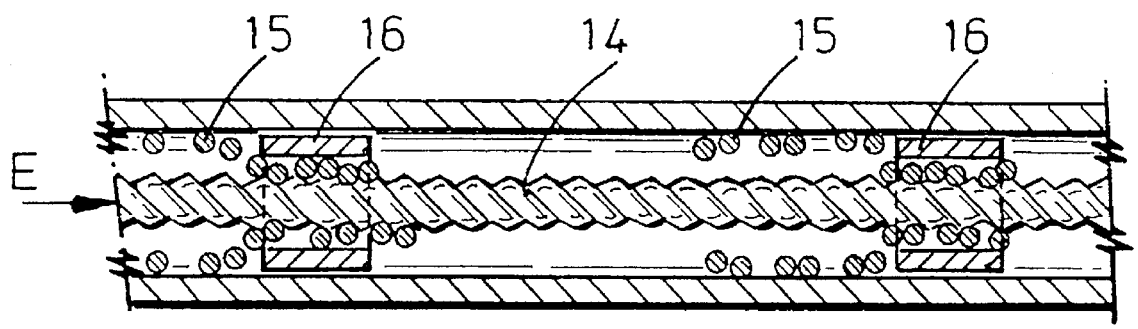
FIG. 6
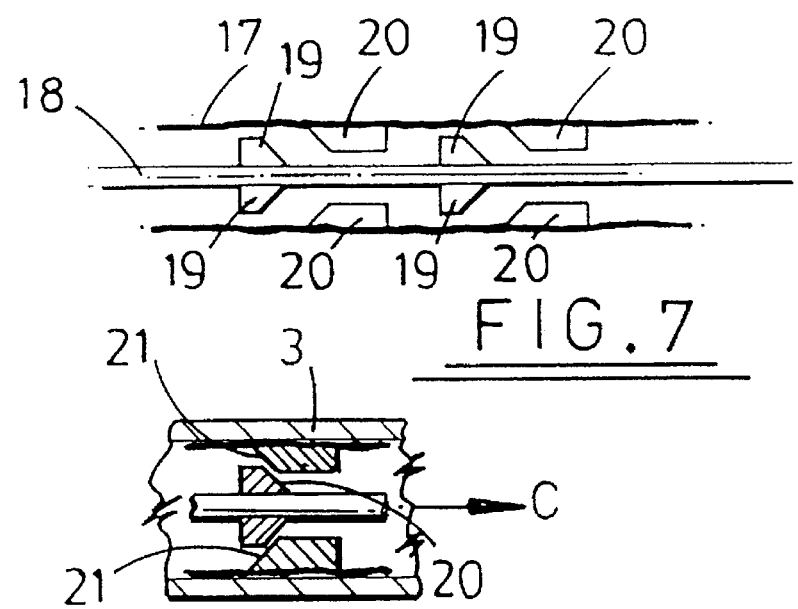
FIG. 7
FIG. 8

APPARATUS FOR REMOVING PIPING FROM THE GROUND

The present invention relates to an apparatus and method for removing piping from the ground, particularly, but not exclusively, lead or galvanised piping used in water distribution systems.

In the past lead piping has been used extensively in water distribution systems. However, lead piping is no longer acceptable to such applications for health risk and environmental reasons. There is now an EEC directive related to the lead content of drinking water which will make it necessary to replace lead piping.

Similarly, the corrosion of galvanised piping can present health risks and have an adverse effect on the environment and thus replacement of such piping with plastic piping is also desirable.

Conventionally, lead pipes are extracted and replaced either by "trenching", i.e. digging down to expose the pipe then cutting it out and replacing it with plastic piping, or by "moling", i.e. using percussive moles to bore alongside the existing lead pipes while dragging in replacement plastic pipes. A combination of both "trenching" and "moling" can be used. Both of these methods of pipe removal/replacement have disadvantages.

"Trenching" is time consuming, labour intensive and costly due to the requirement of removal of extracted thoroughfare material and also of filling up the trench (using stone etc.) to local authority requirements.

Percussive moles are expensive pieces of equipment and also can be erratic and consequently may track off the desired path and either surface where they are not wanted, causing unwanted damage, or simply travel so far from the desired path that the pipe removal replacement operation must be stopped until the mole is found and dug out. "Moling" is thus a comparatively expensive operation and can involve time-consuming and expensive downtime and surface damage repair. There is also a possibility that when the mole veers off track it will damage other underground services.

There are also existing methods of pipe removal which involve coupling the end of a cable to the pipe and dragging the pipe out of the Ground using a winch or other suitable machinery. A new pipe can be simultaneously dragged in position behind the old pipe, However, such existing methods have proved unsatisfactory. The cable is coupled to the pipe either by clamping the end of the cable to the front end of the pipe or by threading the cable through the pipe and clamping it to the rear end of the pipe. With the former method, the pipe may simply break in the location of the coupling under the strain of the pulling force and with the latter method, a length of pipe ahead of the coupling may simply distort when the pulling force is applied thereby rendering removal by this method difficult if not impossible.

A method of pipe removal/replacement intended to overcome the above problems is proposed in International Patent Application No. WO92/10701. A wire rope is inserted through the pipe to be removed and then a settable bonding material is introduced into the pipe in the annular gap between the rope and the internal wall of the pipe. The bonding material is allowed to set thereby forming a bond between the rope and the pipe along the whole length of the pipe. The pipe is then removed from the ground via the pulling or pushing of the wire rope. The bond between the wire rope and the resin distributes the pulling/pushing force along the whole length of the pipe. This method is effective but suffers several disadvantages. The method is relatively difficult to implement and costly as the bonding material cannot be re-used, and the wire rope cannot be re-used unless the bonding material is first removed from it.

It is an object of the present invention to obviate or mitigate the disadvantages discussed above.

According to a first aspect of the present invention there is provided apparatus for removing piping from the ground, comprising an elongate flexible element and pipe engaging means disposed along the length of the flexible element, the pipe engaging means and the flexible element being insertable into a pipe in a first direction relative to the pipe, and being arranged such that attempted withdrawal of the flexible element in the opposite direction to said first direction causes the pipe engaging means to jam the flexible element in the pipe.

With the apparatus according to the present invention, the force required to pull the pipe from the ground is distributed along the length of the pipe.

The pipe engaging means may comprise barbs which extend from the flexible element at a plurality of locations along its length, the arrangement being such that said barbs permit insertion of the flexible element in one direction relative to the pipe but jam the flexible element in the pipe if withdrawal of the flexible element from the pipe is attempted in the opposite direction.

The term "barb" used above and hereinafter is to be understood to mean a member which engages the pipe to resist withdrawal of the flexible element in one direction but allows the flexible element to be moved through the pipe in the opposite direction.

The flexible element preferably comprises a multi-strand cable. The barbs may, for example, in this case be bound into the cable at a plurality of spaced apart locations along it's length. Alternatively the barbs may comprise springs or clips which are fixed onto the flexible element at spaced apart locations along its length.

Preferably the flexible element is a multi-strand steel cable and the barbs comprise cable strands which have free ends projecting outwardly from the cable. In other words, the cable may effectively be frayed along its length to provide the barbs. Alternatively the flexible element may comprise a wire supporting brush strands (e.g. steel), the wire being woven into the core of the flexible element such that the steel strands protrude from the flexible element to form said barbs.

As a further alternative the pipe engaging means may comprise cylindrical sleeves fixed at spaced apart locations along the length of the flexible element, and coil springs disposed around the cable between each adjacent pair of cylindrical sleeves, wherein each sleeve has an end tapering towards the cable such that attempted withdrawal of the cable from the pipe in said opposite direction to the direction of insertion causes an end of each coil spring to ride up the tapered end of a respective sleeve thereby forcing said end of each spring radially outwards thereby jamming the flexible element in the pipe.

As a yet further alternative, the pipe engaging means comprises woven tubular sheaths disposed along the length of the flexible element, each sleeve having one end fixed to the flexible element between the flexible element and a surrounding collar, the arrangement being such that attempted withdrawal of the flexible element from the pipe in said opposite direction causes each sheath to bunch up ahead of a respective collar and thereby jam the flexible element in the pipe.

In an alternative embodiment of the invention the pipe engaging means comprises first wedge members fixed to the flexible element, and second edge members fixed to a tubular sheath disposed around the flexible element, the arrangement being such that movement of the flexible element relative to the sheath and pipe in an axial direction causes the first and second wedge members to cooperate so as to force the second wedge members radially outwards thereby jamming the flexible element in the pipe.

Preferably the sheath is fabricated from a woven steel mesh.

Preferably the first wedge members comprise generally conical members mounted co-axially on the flexible element.

Preferably the second wedge members comprise expandable collars fixed to the external surface of the sheath. For instance, the wedge members may comprise axially split steel collars.

According to a second aspect of the present invention there is provided a method of removing piping from the ground using the above apparatus, wherein the elongate flexible element and pipe engaging means are first inserted into a pipe in a first direction, the flexible element is then pulled in the opposite direction to said first direction so as to cause the pipe engaging means to jam the flexible element in the pipe, and the pipe is removed from the ground by further pulling of the flexible element in said opposite direction.

Preferably the inserted end of the flexible element is passed through the entire length of the pipe to be removed and is coupled to an end of a new pipe which is to replace the pipe being removed so that the new pipe is drawn into position by the flexible element as the old pipe is pulled from the ground.

According to a third aspect of the present invention there is provided apparatus for removing piping from the ground, comprising a first elongate flexible element having first wedge members disposed at spaced apart locations along its length and a second elongate flexible element having second wedge members disposed at spaced apart locations along its length, the first and second elongate flexible elements being insertable together into a pipe to be removed from the ground, wherein the spacing and configuration of the first and second wedge members is such that subsequent to insertion into a pipe partial withdrawal of the first elongate element relative to the second elongate element causes the wedge members to cooperate so as to jam the elongate flexible elements in the pipe.

According to a fourth aspect of the present invention there is provided a method of removing piping from the ground using apparatus according to the third aspect of the invention, wherein said first and second elongate flexible elements are inserted together into a pipe in a first direction, the first flexible element is then pulled in said first direction relative to the second elongate member to cause the first and second wedge members to cooperate and jam the first elongate flexible element in the pipe, and the pipe is removed from the ground by further pulling the first elongate flexible member in said first direction.

The present invention will now be described, by way of example, with reference to the accompanying drawings, in which:

FIGS. 4–8 illustrate apparatus according to other embodiments of the present invention.

Figure 1:
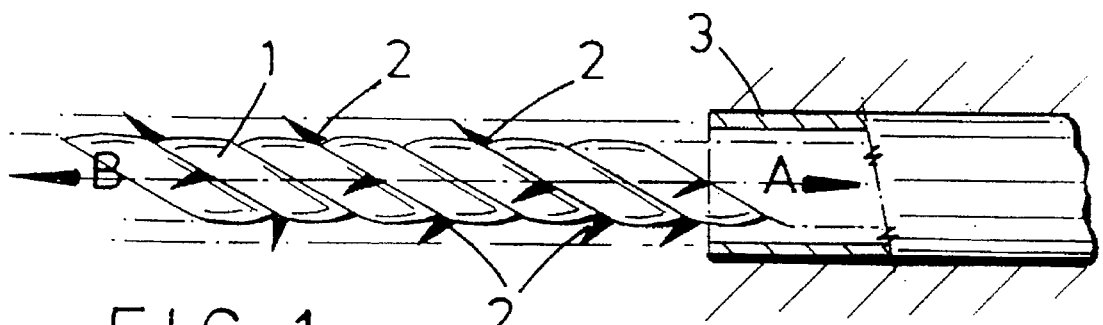
FIG. 1 shows apparatus according to a first embodiment of the present invention.

Referring to FIG. 1, the illustrated cable (only a short length of which is shown) comprises a multi-strand steel cable 1 into which steel barbs 2 have been woven at regular and frequent intervals along its length.

In use, to remove a water distribution pipe from the ground, a pipe 3 to be removed is first exposed by excavation and is isolated from the supply system in accordance with known methods. A length of cable 1 is then fed down the length of the pipe 3 in the direction of arrow A with the barbs 2 pointing in the opposite direction to the direction of insertion. The cable 1 may be fed into the pipe 3 in a number of ways which will not be described in detail here. For instance, the cable could be fed from a coiled supply by a power driven spinner machine in accordance with known methods which are used to feed wire cables through pipes in existing pipe removal systems. Such a spinner machine rotates the cable as it is driven forwards to ease it's passage through the pipe.

The cable 1 is fed along the pipe 3 until the inserted end of the cable reaches the far end of the pipe 3 (not shown). The cable may either be fed into the pipe from the end of insertion, or drawn through the pipe, for instance using a steel cable drawn by a winch at the opposite end of the pipe. The opposite end of the cable 1 is then connected to a winch (not shown) which is used to pull the cable 1 in the opposite direction to that in which it was inserted into the pipe 3, i.e. in the direction of arrow B. When pulled in this direction, the barbs 2 engage the inner wall of the pipe 3 thereby distributing force between the cable 1 and the pipe 3 along the whole length of the pipe 3 and thus the pipe 3 is pulled from the ground.

Because the pulling force is distributed to the pipe 3 along its whole length the problems encountered in existing methods in which the pulling force is concentrated at a single coupling between the cable and the pipe do not occur.

Once the pipe 3 has been removed from the ground the cable 1 can be drawn out of the pipe 3, simply by pulling the cable out of the pipe 3 in the same direction relative to the pipe 3 in which it was first inserted into the pipe, and thereafter be re-used.

It will be appreciated that whilst it is preferable for the cable 1 to be fed along the entire length of the pipe 3 so that as the pipe 3 is removed the pulling force is distributed along it's entire length, this may not be necessary in all cases. For instance, feeding the cable through only half, or some other portion, of the length of the pipe may be sufficient to distribute the pulling load adequately to enable removal of the pipe without the pipe breaking or distorting. The amount of cable which must be fed into any given pipe will depend upon a number of factors including the length, weight per length, and material of the pipe in question, and the local ground conditions.

Prior to feeding the cable 1 into the pipe, a die former may be pulled through the pipe to pre-form it and ensure that it has the necessary cross-section along its length. This pre-forming operation could be a distinct preliminary operation or alternatively the die former could be fixed to the cable 1 ahead of the pipe engaging means.

In a modification of the above described pipe removal method, the cable is fed along the entire length of the pipe to be removed so that the inserted end of the cable emerges from the far end of the pipe. This end of the cable is then coupled to a new, typically plastic, pipe which is then drawn into position in the location of the existing pipe as the existing pipe is itself being pulled out of the ground. Any suitable form of coupling could be used and thus further details will not be given here.

It will be understood that the number of barbs 2 provided along the length of cable 1 may be varied considerably. Testing and experience will readily demonstrate the arrangement of barbs necessary for any given application of the cable.

Figure 2:
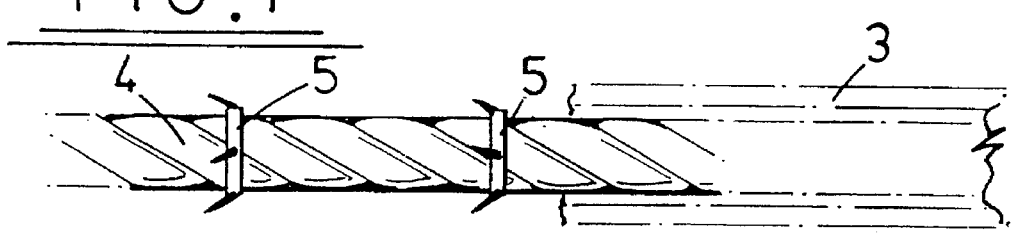
FIG. 2 shows apparatus according to a second embodiment of the present invention.
Figure 3:
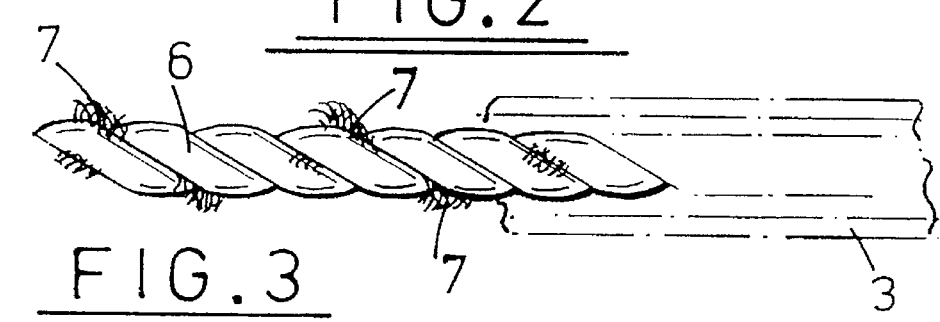
FIG. 3 shows apparatus according to a third embodiment of the present invention.
Figure 4:
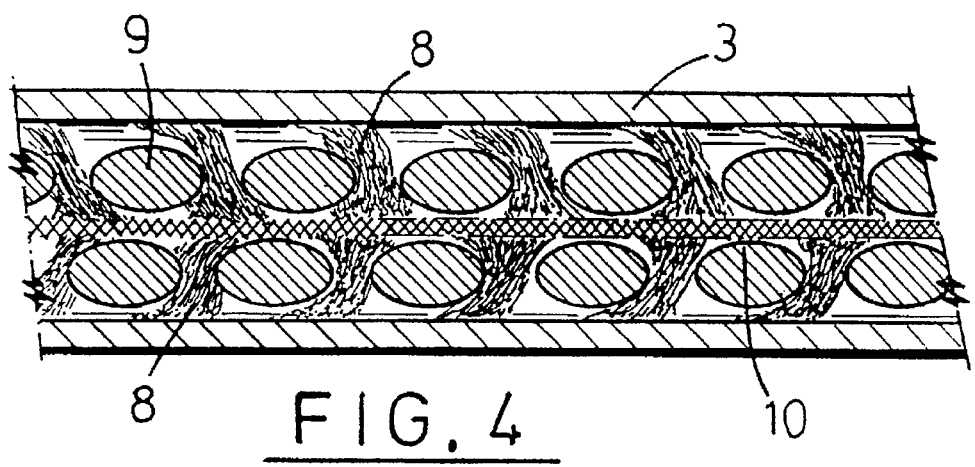

It will also be understood that the cable and/or barbs may take a wide variety of forms. Three possible alternative structures are shown in FIGS. 2, 3 and 4 respectively. FIG. 2 illustrates a synthetic multi-strand cable 4 to which barb members 5 are fixed at various intervals along it's length. FIG. 3, illustrates a multi-strand steel cable 6 which is frayed at various points along it's length, the frayed strand ends 7 forming the barbs. The structure of FIG. 4 is similar to that of FIG. 3 in that steel strand ends 8 protrude from a cable 9 to form the barbs, but in this case the strands 8 are wound into a brush wire 10 which is woven into the core of the cable 9 such that the strands 8 protrude through that cable. In addition, whereas in FIGS. 1 to 4, the various barbs project from the respective cables in a number of different radial directions, this need not necessarily be the case. For example, the barbs could be confined to a single plane to, for instance, more readily facilitate coiling and safe handling of the cable.

As mentioned above, the barbs could take a wade variety of forms and be provided in any appropriate way either as an integral part of the cable 1 or as a subsequently added component. The only conditions which limit the configuration of the barbs are that they must allow the cable to be fed through a pipe in one direction but present substantial resistance to removal of the cable from the pipe in the opposite direction.

Referring to FIG. 5, a fifth embodiment of the present invention is illustrated which comprises spaced apart sleeves 11 fixed to a cable 12. The sleeves 11 are generally cylindrical, each having a large diameter end (which has a maximum diameter slightly less than the internal diameter of a pipe 3 into which the cable is to be inserted) and an opposite tapering end which narrows towards the cable 12. Disposed between each adjacent pair of sleeves 11 are respective coil springs 13, each one of which extends from the large diameter end of one sleeve 11 to the tapered end of an adjacent sleeve 11. The arrangement is such that the cable 12 may be inserted into a pipe 3 in a direction indicated by arrow D in FIG. 5, i.e. with the large diameter end of the sleeves entering the pipe 3 first. During insertion any friction between the springs 13 and the inner wall of the pipe 3 will tend to push the respective ends up the springs 13 down the tapering ends of the sleeves 11 and away from contact with the inner wall of the pipe 3. Once the cable 12 has been inserted the required distance into the pipe 3, withdrawal of the cable in the opposite direction to insertion causes respective ends of the coil springs 13 to ride up the tapered ends of the sleeves 11 and thus jam in between the sleeves 11 and the inner wall of the pipe 3 thereby securing the cable 12 in the pipe 3. The pipe 3 can then be removed from the ground whereafter the cable can be readily dislodged from the pipe 3 by simply pulling the cable through the pipe in the direction of original insertion.

Another embodiment of the invention is illustrated in FIG. 6. A cable 14 has a number of relatively short tubular woven sheaths 15 spaced apart along its length. One end of each sheath 15 is secured to the cable 14 between the cable 14 and a respective tubular sleeve 16. In use, the cable 14 may be inserted into a pipe 3 in a direction indicated by arrow E during which insertion the unsecured ends of each sheath 15 simply follow the respective sleeves 16 into the pipe 3. However, on attempted withdrawal of the cable in the opposite direction a combination of the friction between the sheaths 15 and the inner wall of the pipe 3 and the presence of the sleeves 16 causes the free end of each sheath 15 to bunch up and thereby jam the cable in the pipe 3. Again, once the pipe 3 has been pulled from the ground the cable 14 can readily be removed from the pipe 3 by pulling it in the direction of original insertion.

A further embodiment of the present invention is shown in FIGS. 7 and 8. Referring to FIG. 7, a tubular woven steel mesh sheath 17 is disposed around a steel cable 18 (only a short length of each are shown). Generally cone shaped wedge members 19 are fixed to the cable 18 at a number of spaced apart locations along it's length and wedge members 20 are fixed to the internal surface of the sheath 17 at spaced apart locations along it's length. The spacing of the wedge members 20 is the same as the spacing of the wedge members 19.

In use, the sheath 17 is first positioned relative to the cable 18 so that each wedge member 20 lies between adjacent wedge members 19, thereby minimising the overall diameter of the cable 18 and sheath 17, as shown in FIG. 7. The cable 18 and sheath 17 are then fed into a pipe 3 (see FIG. 8) in this arrangement.

Referring to FIG. 8, once the cable 18 and sheath 17 have been inserted into the pipe 3, the cable 18 (but not the sheath 17) is partially withdrawn in the direction of arrow C to bring together the wedge members 19 and 20. The wedge members 19 and 20 then cooperate, by virtue of respective oppositely sloped contact faces 21 and 22, so that attempted further withdrawal of the cable 18 forces the wedge members 20 radially outwards thereby jamming the sheath 17 and cable 18 within the pipe 3. The pipe 3 is then pulled from the ground by further drawing on the cable 18 in the direction of arrow C. As above, a new pipe can simultaneously be drawn into position as the pipe 3 is removed.

Once the pipe 3 has been removed from the ground, the cable 18 and/or sheath 17 can be pulled/pushed in opposite directions so as to disengage the wedge member 19 and 20 (i.e. returning to the arrangement of FIG. 7) to allow the cable 18 and sheath 17 to be removed from the pipe 3 for subsequent re-use.

As a modification to the above described embodiment of the invention, the wedge members fixed to the sheath 17 could comprise expandable collars fixed to the external surface of the sheath 17. For instance, the wedge members could be axially split steel rings.

As a further modification to the above embodiment of the present invention, the wedge members could be configured so that they can be made to jam the cable in the pipe by partially withdrawing the cable from the pipe in either direction, and thus the pipe can be removed from the ground by pulling the cable in either direction. For instance, each wedge member carried by the sheath and the cable could be provided with a pair of oppositely sloped contact faces. Thus withdrawing the cable in one direction would cause a wedge member carried by the cable to cooperate with one of a pair of adjacent wedge members carried by the sheath, and withdrawing the cable in the opposite direction would cause the edge member carried by the cable to cooperate with the other of the pair of wedge members carried by the sheath.

It will be understood that the detailed form of the wedge members may be varied considerably.

We claim:

1. Apparatus for removing piping from the ground, comprising an elongate flexible element and pipe engaging means disposed along a length of said flexible element, said pipe engaging means and said flexible element being insertable into a pipe in a first direction relative to the pipe, wherein said pipe engaging means comprises:

sleeves positioned at spaced apart locations along the length of said flexible element; and substantially tubular deformable members disposed around said flexible element between said sleeves, said deformable members being sized to substantially continuously contact the pipe with sufficient frictional force such that the frictional forces will cause said deformable members to deform ahead of said sleeves to jam said flexible element in the pipe upon attempted withdrawal of said flexible element from the pipe in a direction opposite to the first direction.

2. Apparatus according to claim 1, wherein said deformable members are woven sheaths, one end of each sheath being fixed to said flexible element by a respective sleeve, whereby attempted withdrawal of said flexible element from the pipe causes each sheath to bunch up ahead of its respective sleeve to thereby jam said flexible element in the pipe.

3. Apparatus for removing piping from the ground, comprising an elongate flexible element and pipe engaging means disposed along a length of said flexible element, said pipe engaging means and said flexible element being insertable into a pipe in a first direction relative to the pipe, wherein said pipe engaging means comprise:

sleeves positioned at spaced apart locations along the length of said flexible element said sleeves having a tapered end; and coil springs disposed around said flexible element between said sleeves, said coil springs being sized to be in substantially constant contact with the pipe during withdrawal of the pipe.

4. Apparatus for removing piping from the ground, comprising an elongate flexible element and tubular pipe engaging members disposed along a length of said flexible element, said pipe engaging members and said flexible element being insertable into a pipe in a first direction relative to the pipe and being arranged such that attempted withdrawal of said flexible element in a direction opposite to the first direction causes said pipe engaging members to engage the pipe to thereby prevent withdrawal of said flexible element from the pipe, characterized in that said pipe engaging members are slidable against the inner surface of the pipe as said flexible element is inserted in the first direction, but friction generated between said pipe engaging members and the pipe upon attempted withdrawal of said flexible element from the pipe in the opposite direction causes said pipe engaging members to jam said flexible element in the pipe.

5. Apparatus according to claim 4, wherein said pipe engaging members have an outer diameter at least of a dimension that is sufficient to contact the inner surface of the pipe substantially around the entire circumference of the inner surface, thereby creating friction between said pipe engaging member and the pipe substantially around the entire circumference of the inner surface of the pipe.

6. Apparatus for removing piping from the ground, comprising an elongate flexible element and pipe engaging means disposed along a length of said flexible element, said pipe engaging means and said flexible element being insertable into a pipe in a first direction relative to the pipe, wherein said pipe engaging means comprises:

sleeves positioned at spaced apart locations along the length of said flexible element; and substantially deformable members disposed around said flexible element between said sleeves, said deformable members being sized to substantially continuously contact the pipe, wherein said deformable members are woven sheaths, one end of each sheath being fixed to said flexible element by a respective sleeve, whereby attempted withdrawal of said flexible element from the pipe causes each sheath to bunch up ahead of its respective sleeve to thereby jam said flexible element in the pipe.

* * * * *